(12) United States Patent
Zhu

(10) Patent No.: US 10,938,264 B2
(45) Date of Patent: Mar. 2, 2021

(54) MOTOR HOUSING MADE OF TITANIUM

(71) Applicant: Wei Zhu, Wuxi (CN)

(72) Inventor: Wei Zhu, Wuxi (CN)

( * ) Notice: Subject to any disclaimer, the term of this patent is extended or adjusted under 35 U.S.C. 154(b) by 269 days.

(21) Appl. No.: 15/774,618

(22) PCT Filed: Oct. 23, 2017

(86) PCT No.: PCT/CN2017/107273
§ 371 (c)(1),
(2) Date: May 9, 2018

(87) PCT Pub. No.: WO2019/071651
PCT Pub. Date: Apr. 18, 2019

(65) Prior Publication Data
US 2020/0274415 A1    Aug. 27, 2020

(30) Foreign Application Priority Data

Oct. 13, 2017   (CN) .......................... 201710949696.6

(51) Int. Cl.
*H02K 5/02* (2006.01)
*H02K 5/22* (2006.01)
(Continued)

(52) U.S. Cl.
CPC ............... *H02K 5/02* (2013.01); *H02K 5/225* (2013.01); *H02K 15/14* (2013.01); *H02K 5/04* (2013.01); *H02K 2213/03* (2013.01)

(58) Field of Classification Search
CPC .. H02K 5/02; H02K 5/04; H02K 5/06; H02K 5/225; H02K 2213/03; H02K 15/14
See application file for complete search history.

(56) References Cited

U.S. PATENT DOCUMENTS 1,819,140 A  *  8/1931  Weyandt ................ H02K 33/12
                                                        310/30
1,945,361 A  *  1/1934  Ball ......................... F16H 1/46
                                                        475/149

(Continued)

FOREIGN PATENT DOCUMENTS

CN          101699717 A       4/2010
CN          102785062 A      11/2012
(Continued)

OTHER PUBLICATIONS

CN106374667A English Translation.*
(Continued)

*Primary Examiner* — Maged M Almawri
(74) *Attorney, Agent, or Firm* — Zhu Lehnhoff LLP

(57) ABSTRACT

A motor housing is made metal titanium and calendar formed by stamping process by using titanium. The motor housing is of a barrel structure, and the barrel wall and bottom are integrally stamped and formed. The other end of the barrel is provided with a barrel cover; rim of the barrel cover is embedded into the stepped groove on the inside of the barrel wall; and the barrel bottom and the barrel cover form a symmetrical structure. The motor housing is a thin-walled housing structure, and the barrel wall is a circular bushing. The barrel bottom and barrel cover are respectively provided with two sections of outward protruding concentric bosses; the barrel bottom and barrel cover are also respectively provided with shaft holes; and fillet connection is provided between the concentric bosses as well as between the concentric boss and the barrel wall.

5 Claims, 3 Drawing Sheets

(51) Int. Cl.
*H02K 15/14* (2006.01)
*H02K 5/04* (2006.01)

(56) References Cited

U.S. PATENT DOCUMENTS

| | | | | |
|---|---|---|---|---|
| 2,592,070 | A * | 4/1952 | Robinson | H02K 5/225 310/71 |
| 3,176,172 | A * | 3/1965 | Wightman | H02K 15/16 310/89 |
| 3,400,285 | A * | 9/1968 | Buck | H02K 7/083 310/90 |
| 3,597,644 | A * | 8/1971 | Preece | H02K 1/148 310/40 R |
| 3,856,200 | A * | 12/1974 | Lieb | B04B 9/14 494/82 |
| 4,016,444 | A * | 4/1977 | Gillet | H02K 55/04 310/216.113 |
| 4,134,712 | A * | 1/1979 | Kemmner | F02M 37/08 403/302 |
| 4,569,641 | A * | 2/1986 | Falk | A61M 5/14216 310/104 |
| 4,931,678 | A * | 6/1990 | Lutz | H02K 11/28 310/62 |
| 5,243,245 | A * | 9/1993 | Oba | H02K 15/14 310/89 |
| 5,391,837 | A * | 2/1995 | Carey | H02G 3/14 174/50 |
| 5,574,321 | A * | 11/1996 | Baker | F04D 25/08 310/67 R |
| 5,625,244 | A * | 4/1997 | Bradfield | H02K 13/003 310/232 |
| 5,679,989 | A * | 10/1997 | Buscher | H02K 26/00 29/596 |
| 5,861,689 | A * | 1/1999 | Snider | H02K 3/522 310/71 |
| 5,895,207 | A * | 4/1999 | Burgdorf | B60T 8/368 417/410.1 |
| 5,952,751 | A * | 9/1999 | Yamakoshi | H02K 5/04 29/596 |
| 6,017,156 | A * | 1/2000 | Depatie | G03B 9/08 310/156.38 |
| 6,163,093 | A * | 12/2000 | Shimizu | B60T 8/4022 310/420 |
| 6,331,746 | B1 * | 12/2001 | Fujitani | H01F 7/145 310/14 |
| 6,420,811 | B1 * | 7/2002 | Wetzel | B60T 8/4022 29/596 |
| 6,673,463 | B1 * | 1/2004 | Onishi | H02K 5/02 428/480 |
| 6,677,693 | B2 * | 1/2004 | Ooyama | H02K 5/148 310/233 |
| 6,753,630 | B1 * | 6/2004 | Ueda | G10K 9/18 310/81 |
| 6,971,489 | B2 * | 12/2005 | Blodgett, Jr. | B60P 3/39 188/158 |
| 7,011,620 | B1 * | 3/2006 | Siess | H02K 3/47 600/16 |
| 7,057,318 | B2 * | 6/2006 | Strobl | F02M 37/08 310/89 |
| 7,187,097 | B2 * | 3/2007 | Tanaka | H02K 3/50 310/154.14 |
| 7,977,833 | B2 * | 7/2011 | Snider | H02K 11/042 310/68 D |
| 9,118,235 | B2 * | 8/2015 | He | H02K 23/00 |
| 10,145,385 | B2 * | 12/2018 | Guo | F04D 29/2277 |
| 10,498,208 | B1 * | 12/2019 | Kebabian | H02K 5/02 |
| 2001/0013726 | A1 * | 8/2001 | Katagiri | H02K 7/085 310/67 R |
| 2002/0047474 | A1 * | 4/2002 | Huang | H02K 1/2793 310/257 |
| 2002/0063482 | A1 * | 5/2002 | Leslie | H02K 5/141 310/89 |
| 2002/0105246 | A1 * | 8/2002 | Ooyama | H02K 11/25 310/239 |
| 2003/0102778 | A1 * | 6/2003 | Koki | H03H 9/0519 310/348 |
| 2004/0021386 | A1 * | 2/2004 | Swett | H02K 21/24 310/156.32 |
| 2004/0104633 | A1 * | 6/2004 | Nishimura | H02K 1/145 310/89 |
| 2005/0110354 | A1 * | 5/2005 | Datta | H02K 5/02 310/88 |
| 2005/0264115 | A1 * | 12/2005 | Su | H02K 5/18 310/89 |
| 2006/0114445 | A1 * | 6/2006 | Ebihara | G03F 7/70325 355/72 |
| 2007/0126297 | A1 * | 6/2007 | de Zwart | B63H 1/16 310/86 |
| 2007/0182265 | A1 * | 8/2007 | Makino | H02K 3/522 310/179 |
| 2007/0256887 | A1 * | 11/2007 | Hirakawa | H02K 5/04 180/444 |
| 2008/0009369 | A1 | 1/2008 | Yokota | |
| 2008/0018187 | A1 * | 1/2008 | Yamaguchi | H02K 29/03 310/81 |
| 2008/0024023 | A1 * | 1/2008 | Jiang | H02K 5/163 310/89 |
| 2008/0129134 | A1 * | 6/2008 | Stout | H02K 5/1732 310/89 |
| 2008/0218014 | A1 * | 9/2008 | Cowan | B23K 20/125 310/83 |
| 2009/0108698 | A1 * | 4/2009 | Guan | H01R 4/024 310/234 |
| 2009/0236149 | A1 * | 9/2009 | Main | E21B 4/006 175/104 |
| 2010/0060108 | A1 * | 3/2010 | Yamada | H05K 3/3442 310/348 |
| 2010/0085706 | A1 * | 4/2010 | Savant | H02K 5/20 361/689 |
| 2011/0109191 | A1 * | 5/2011 | Altea | H02K 1/185 310/216.118 |
| 2011/0291510 | A1 * | 12/2011 | Hara | H02K 7/061 310/91 |
| 2013/0099603 | A1 * | 4/2013 | Lee | H02K 1/34 310/25 |
| 2014/0139061 | A1 * | 5/2014 | Gutjahr | H02K 5/128 310/86 |
| 2015/0054371 | A1 * | 2/2015 | Lay | H02K 1/18 310/154.12 |
| 2015/0061651 | A1 * | 3/2015 | Ozaki | H02K 24/00 324/207.16 |
| 2015/0239334 | A1 * | 8/2015 | El Baraka | B60K 6/26 310/78 |
| 2015/0249372 | A1 * | 9/2015 | Sakaue | H02K 3/345 310/203 |
| 2015/0266039 | A1 * | 9/2015 | Ulrich | B05B 5/0532 239/707 |
| 2015/0357886 | A1 * | 12/2015 | Ishizeki | H02K 5/225 310/71 |
| 2016/0013698 | A1 * | 1/2016 | Hozumi | F04D 19/04 310/86 |
| 2016/0268864 | A1 * | 9/2016 | Poon | H02K 1/04 |
| 2016/0268866 | A1 * | 9/2016 | Matsumoto | H02K 15/022 |
| 2016/0308418 | A1 * | 10/2016 | Garvey | H02K 5/06 |
| 2017/0104395 | A1 * | 4/2017 | Tamura | H02K 5/14 |
| 2018/0030944 | A1 * | 2/2018 | Raad | F02N 11/04 |
| 2018/0358849 | A1 * | 12/2018 | Saint-Michel | H02K 5/18 |
| 2019/0202591 | A1 * | 7/2019 | Oh | H01R 13/64 |
| 2020/0028404 | A1 * | 1/2020 | Yamagata | H02K 15/12 |
| 2020/0036265 | A1 * | 1/2020 | Goatley | H02K 5/08 |
| 2020/0220414 | A1 * | 7/2020 | Kim | H02K 3/522 |
| 2020/0303986 | A1 * | 9/2020 | Stubner | H02K 29/08 |

FOREIGN PATENT DOCUMENTS

| | | |
|---|---|---|
| CN | 104923603 A | 9/2015 |
| CN | 204928418 U | 12/2015 |
| CN | 106374667 A | 2/2017 |

(56) References Cited

FOREIGN PATENT DOCUMENTS

| | | | |
|---|---|---|---|
| CN | 206164259 U | | 5/2017 |
| CN | 207382094 U | | 5/2018 |
| CN | 106374667 A | * | 9/2018 |
| EP | 3199256 A1 | | 8/2017 |
| JP | S5487212 A | | 7/1979 |
| JP | H09216004 A | | 8/1997 |

OTHER PUBLICATIONS

PCT/CN2017/107273, International Search Report, issued by SIPO, dated Jun. 7, 2018.
PCT/CN2017/107273, Opinion by ISA, issued by SIPO, dated Jun. 7, 2018.
Supplementary European Search Report, issued by EPO in EP17875065, dated Mar. 25, 2020.

* cited by examiner

MOTOR HOUSING MADE OF TITANIUM

TECHNICAL FIELD

This invention relates to the technical field of motor parts and components production and manufacturing, specifically relates to a motor housing made of titanium.

TECHNICAL BACKGROUND

Characterized by light weight, high strength, having metallic luster, corrosion resistance, high/low temperature resistance, etc., titanium is an ideal stamping material for motor housing. However, due to its difficulty in forming and machining as well as high cost, there is no record of motor housing made of titanium in prior art. In the present stage, people cannot manufacture motor housing by using titanium.

When a titanium alloy has a hardness of more than HB350, its machining and cutting is extremely difficult, and when its hardness is less than BH300, it can very easily stick to the cutters, also making cutting difficult. However, hardness of titanium alloy is only one of the reasons for the cutting and machining difficulties, what is more critical is the impact of the combined chemical, physical and mechanical performances of titanium alloy itself on machinability. Titanium alloy has the following machinability-related characteristics:

(1) Small deformation coefficient: This is a remarkable characteristics of titanium in respect of cutting and machining, and the deformation coefficient is smaller than or close to 1. The slide and friction distance of swarf on the rake face of the cutter increases greatly, which accelerates the cutter wear and reduces the elongation.

(2) High cutting temperature: Since titanium alloys have a very small heat conductivity coefficient (only equivalent to 1/5~1/7 of that of #45 steel), and the length of contact between the swarf and the rake face of the cutter is extremely short, heat produced during cutting cannot be easily conducted out and concentrates in the cutting zone and in a small area near the cutter edge, resulting in a very high cutting temperature. Under the same cutting condition, the cutting temperature can be twice that of #45 steel.

(3) Big unit area cutting force: The main cutting force is about 20% smaller than when cutting steel. Since the length of contact between the swarf and the rake face of the cutter is extremely short, the unit contact-area cutting force increases greatly, which can easily cause tipping. Meanwhile, due to a small elasticity modulus of titanium alloys, this can easily give rise to bending deformation under the action of radial force during machining, resulting in vibration, adding to tool wear and affecting the precision of parts and components. Therefore, the process system should have a good rigidity.

(4) Severe chilling phenomenon: Attributable to the high chemical activity of titanium, hard and crispy scales can be easily formed by absorbing O2 and N2 in the air at a high cutting temperature; Meanwhile, the plastic deformation during cutting operation may also cause surface hardening. Not only reducing fatigue strength of the parts and components, the chilling phenomenon can also aggravate tool wear, which is a very important characteristic demonstrated during titanium cutting.

(5) Easy tool wear: After processed by stamping, forging and hot rolling and other methods, hard and crispy uniform scales can be formed, which can easily cause tipping phenomenon, making hard scale cutoff the most difficult procedure in titanium alloy machining. Furthermore, since titanium alloy has a very high chemical affinity towards the materials of the tools, it is very easy to produce accretion wear to the tools under a high cutting temperature and a high unit area cutting force. During turning of titanium alloy, sometimes the wear on the rake face of the cutter is even more severe than flank face of the cutter. At a feed rate f<0.1 mm/r, wear mainly occurs on the flank face of the cutter. At f>0.2 mm/r, wear will occur on the rake face of the cutter. During finish turning and semi-finish turning by using hard alloy cutters, wear on the flank face of the cutter is more appropriate with VBmax<0.4 mm.

When it comes to milling, since titanium alloys have a very small heat conductivity coefficient, and the length of contact between the swarf and the rake face of the cutter is extremely short, heat produced during cutting cannot be easily conducted out and concentrates in the cutting deformation zone and in a small area near the cutter edge, as a result, a extremely high cutting temperature can be formed at the cutting edge during machining, which may greatly shorten the service life of the tools. In respect of titanium alloy Ti6Al4V, under the conditions permitted by the tool strength and machine tool power, the magnitude of cutting temperature is the critical factor affecting the cutter life instead of the cutting force.

Machining of titanium is very difficult. The metal itself is not hard, but it is very "sticky". If a file is used for filing of a tool holder made of titanium-64, cutting ridges of the file may be filled up immediately by the raspings filed off. At present, cutting or mould pressing method is used, and since titanium can not be cut at a low speed and it may be oxidized due to the excessive heat when cutting at high speed, titanium alloy products cannot be machined at ordinary machining center, while mould pressing can easily give rise to cracks.

SUMMARY OF THE INVENTION

An object of the present invention is to overcome the drawbacks existing in the prior art and provide a stamping method for machining motor housings of titanium material, by which lightweight, high strength and corrosion-resisting titanium motor housing products can be made.

To fulfill the above object, an embodiment of the present invention is to design a motor housing made of titanium, the said motor housing is calendar formed by stamping by using metal titanium, the said motor housing is of a barrel structure, the barrel wall and bottom are integrally stamped and formed, the other end of the barrel is provided with a barrel cover, rim of the barrel cover is embedded into the stepped groove on the inside of the barrel wall, and the barrel bottom and the barrel cover form a symmetrical structure.

To allow for easy installation of the motor stator and rotor inside the housing, and ensure it has sufficient strength, wear-resistance and corrosion resistance, a preferred embodiment of the present invention is characterized in that the said motor housing adopts a thin-walled housing structure and the barrel wall is a circular bushing.

To allow for easy installation of the motor stator and rotor inside the housing, and ensure it has sufficient strength, wear-resistance and corrosion resistance, a further preferred embodiment of the present invention is characterized in that the said barrel bottom and barrel cover are respectively provided with two sections of outward protruding concentric bosses, the said barrel bottom and barrel cover are also respectively provided with shaft holes, and fillet connection is provided between the concentric bosses as well as between the concentric boss and the barrel wall.

To allow for easy connection of the motor terminal with external power supply, a still further preferred embodiment of the present is characterized in that a pair of center symmetrical electrode lead-out holes is provided at the said barrel bottom or barrel cover.

To allow for easy control of the motor, or easy observation of the motor operating status, a further preferred embodiment of the present invention is characterized in that a through window is provided in the barrel wall near the said electrode lead-out hole.

To allow for easy machining of the motor, easy subassembly and easy dust prevention of the motor, a further preferred embodiment of the present invention is characterized in that the said barrel cover is connected with the barrel wall through a welded or riveted structure.

To adapt to the requirements of motors of different types on the housing, a further preferred embodiment of the present invention is also characterized in that the ratio of length to diameter of the said motor housing is 1.2~1.8:1.

To minimize the housing weight and the use of raw materials while ensuring the motor housing has the specified strength, a further preferred embodiment of the present invention is also characterized in that the wall thickness of the motor housing is 0.8~1.2 mm.

To further reduce the structure size of the motor, reduce the failure rate of the motor during operation and extend the service life of the motor, a still further preferred embodiment of the present invention is also characterized in that brushless DC motor is installed in the said motor housing, the motor shaft of which extends out of the center hole of the barrel bottom and/or barrel cover.

To allow for easy stamping of the titanium housing, a still further preferred embodiment of the present invention is also characterized in that a lubricant coating is provided on the inner and outer surface of the barrel wall, barrel bottom and barrel cover of the said motor housing before stamping.

The present invention has the following advantages and favorable effects: The said motor housing made of titanium is characterized by simple structure, light weight, high strength and corrosion resistance, can be manufactured by stamping method by using titanium, and the housing has all advantages that possessed by metal titanium. Furthermore, it is possible to manufacture in large batches, with a high efficiency and at a low cost.

Figure 1:
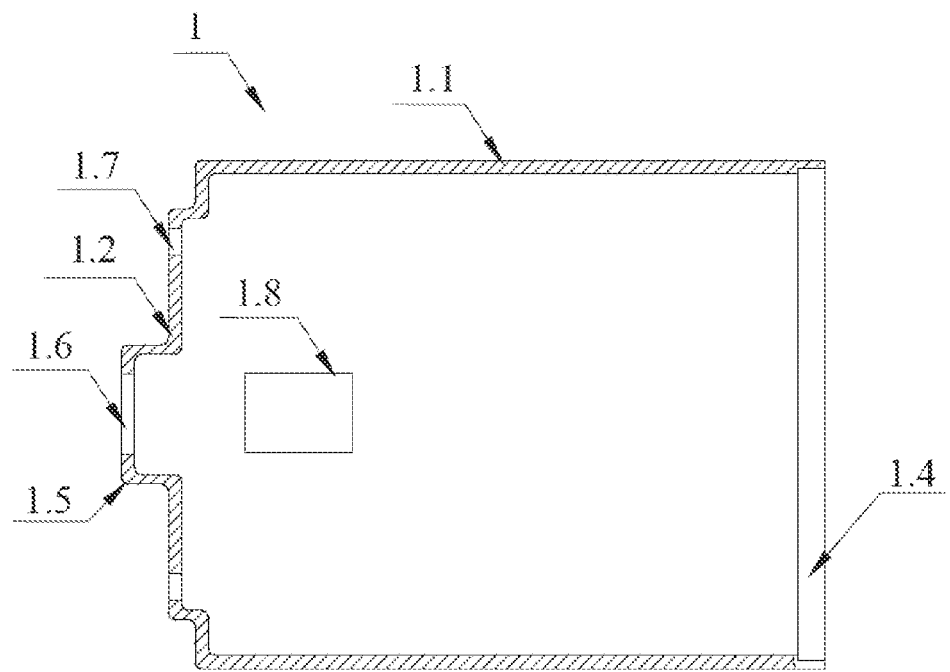
FIG. 1 is the main cutaway schematic view of the barrel wall and barrel bottom of the motor housing according to the present invention.

In the drawings: 1. Motor housing; 1.1 Barrel wall; 1.2 Barrel bottom; 1.3 Barrel cover; 1.4 Stepped grooves; 1.5 Concentric bosses; 1.6 Shaft hole; 1.7 Electrode lead-out hole; 1.8 Window

DETAILED DESCRIPTION OF THE PREFERRED EMBODIMENTS

The invention will now be described in more detail with reference to the accompanying drawings and embodiments.

The following embodiments are merely intended for a better illustration of the present invention, rather than limiting the scope of the present invention.

Figure 2:
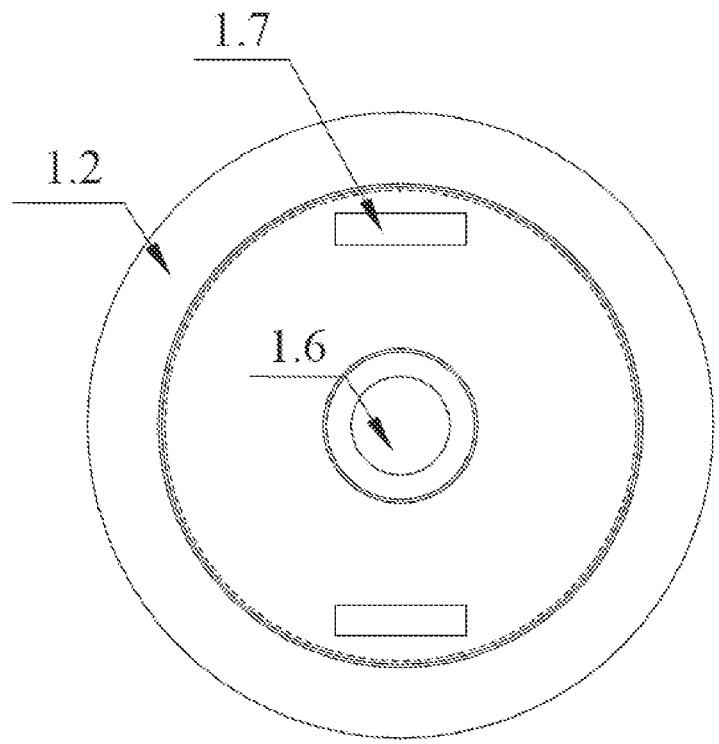
FIG. 2 is a schematic structure left view of FIG. 1.
Figure 3:
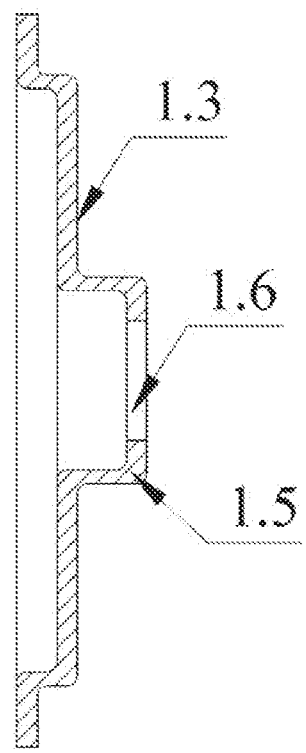
FIG. 3 is the main cutaway schematic view of the barrel cover of the motor housing according to the present invention.
Figure 4:
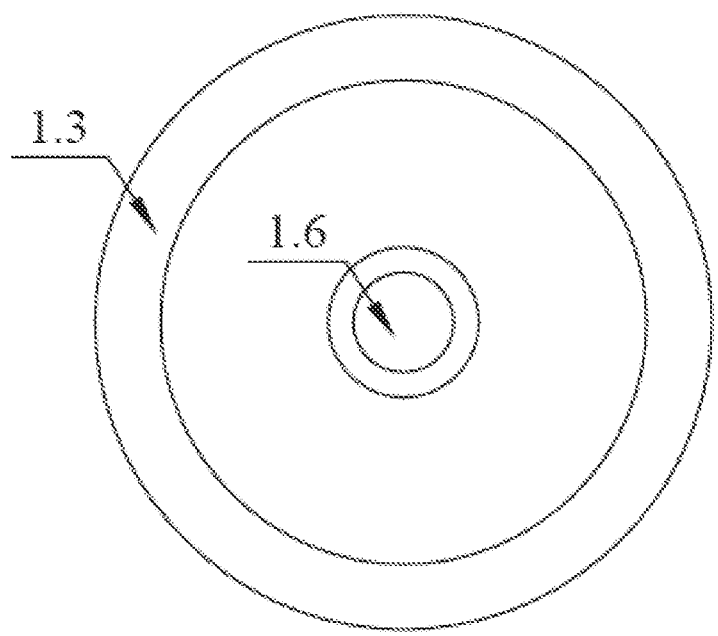
FIG. 4 is a schematic structure right view of FIG. 3.
Figure 5:
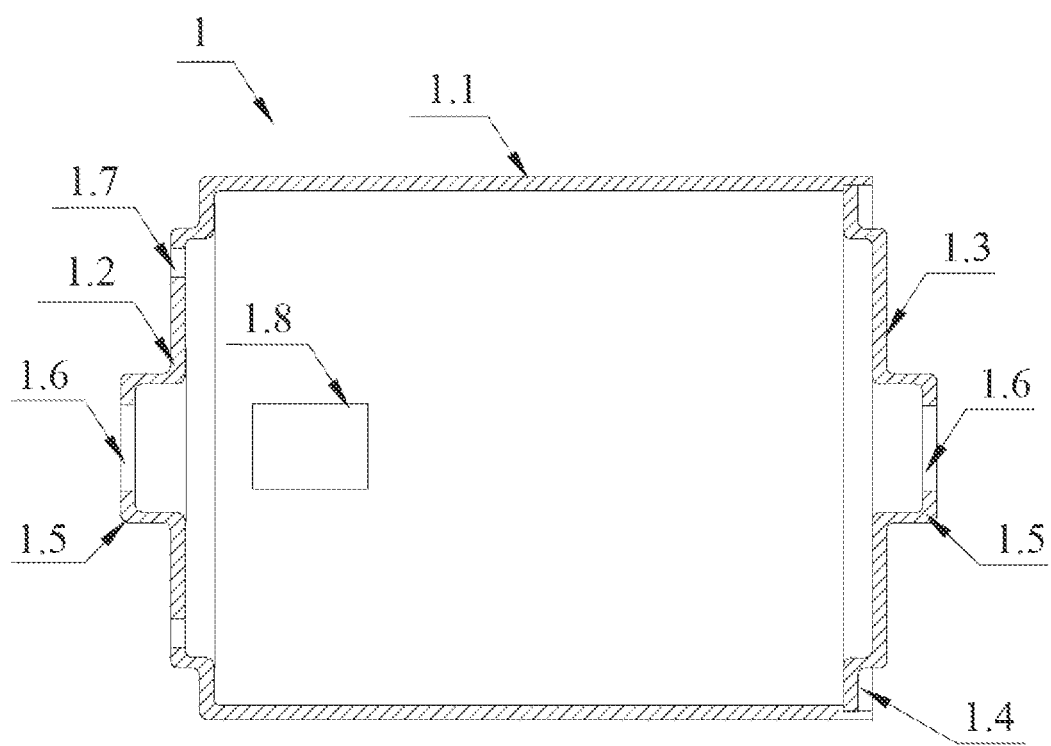
FIG. 5 is the main cutaway schematic view of the assembled motor housing according to the present invention.

As shown in FIGS. 1-5, the present invention relates to a motor housing 1 manufactured by using metal titanium, the said motor housing 1 is calendar formed by stamping by using titanium, the said motor housing 1 is of a barrel structure, barrel wall 1.1 and barrel bottom 1.2 is are integrally stamped and formed, the other end of the barrel is provided with a barrel cover 1.3, rim of barrel cover 1.3 is embedded into the stepped groove 1.4 on the inside of barrel wall 1.1, and barrel 1.2 and barrel cover 1.3 form a symmetrical structure.

To allow for easy installation of the motor stator and rotor inside the housing and ensure it has sufficient strength, wear-resistance and corrosion resistance, a preferred embodiment of the present invention is characterized in that motor housing 1 is a thin-walled housing structure, and the barrel wall is a circular bushing.

To allow for easy installation of the motor stator and rotor inside the housing, and ensure it has sufficient strength, wear-resistance and corrosion resistance, a further preferred embodiment of the present invention is characterized in that the said barrel bottom 1.2 and barrel cover 1.3 are respectively provided with two sections of outward protruding concentric bosses 1.5, the said barrel bottom 1.2 and barrel cover 1.5 are also respectively provided with shaft holes, and fillet connection is provided between the concentric bosses 1.5 as well as between the concentric boss 1.5 and the barrel wall 1.1.

To allow for easy connection of the motor terminal with external power supply, a still further preferred embodiment of the present is characterized in that a pair of center symmetrical electrode lead-out holes 1.7 is provided at the said barrel bottom 1.2 or barrel cover 1.3.

To allow for easy control of the motor, or easy observation of the motor operating status, a further preferred embodiment of the present invention is characterized in that a through window 1.8 is provided in the barrel wall 1.1 near the said electrode lead-out hole 1.7.

To allow for easy machining of the motor, easy subassembly and easy dust prevention of the motor, a further preferred embodiment of the present invention is characterized in that the said barrel cover 1.3 is connected with the barrel wall 1.1 through a welded or riveted structure.

To adapt to the requirements of motors of different types on the housing, a further preferred embodiment of the present invention is also characterized in that the ratio of length to diameter of the said motor housing 1 is 1.2~1.8:1, preferably 1.5.

To minimize the housing weight and the use of raw materials while ensuring the motor housing has the specified strength, a further preferred embodiment of the present invention is also characterized in that the wall thickness of the motor housing 1 is 0.8~1.2 mm, preferably 1 mm.

To further reduce the structure size of the motor, reduce the failure rate of the motor during operation and extend the service life of the motor, a still further preferred embodiment of the present invention is also characterized in that brushless DC motor is installed in the said motor housing 1, the motor shaft of which extends out of the center hole of the barrel bottom 1.2 and/or barrel cover 1.3.

To allow for easy stamping of the titanium housing, a still further preferred embodiment of the present invention is also characterized in that a lubricant coating is provided on the inner and outer surface of the barrel wall, barrel bottom 1.2 and barrel cover 1.3 of the said motor housing 1 before stamping.

The above descriptions are only preferred embodiments of the present invention, and it should be pointed out that it is apparent to those skilled in the art that a number of improvements and variations can also be made without departing from the technical principles of the present invention, and those improvements and variations shall also be deemed within the scope of the present invention.

The invention claimed is:

1. A motor housing manufactured by using metal titanium, wherein the motor housing is calendar formed by stamping process by using titanium, the motor housing is of a barrel structure, a barrel wall and bottom are integrally stamped and formed, the other end of the barrel is provided with a barrel cover, a rim of the barrel cover is embedded into a stepped groove on an inside of the barrel wall, and the barrel bottom and the barrel cover form a symmetrical structure, wherein the motor housing is a thin-walled housing structure and the barrel wall is a circular bushing, wherein the barrel bottom and barrel cover are respectively provided with two sections of outward protruding concentric bosses, the barrel bottom and barrel cover are also respectively provided with shaft holes, and fillet connection is provided between the concentric bosses as well as between the concentric boss and the barrel wall, wherein a pair of center symmetrical electrode lead-out holes is provided at the barrel bottom or barrel cover, wherein a through window is provided in the barrel wall near the electrode lead-out hole, wherein the barrel cover is connected with the barrel wall through a welded or riveted structure, and wherein the ratio of length to diameter of the motor housing is 1.2 to 1.8:1.

2. The motor housing made of titanium as defined in claim 1, wherein a lubricant coating is provided on an inner and outer surface of the barrel wall, the barrel bottom and the barrel cover of the motor housing before stamping.

3. The motor housing made of titanium as defined in claim 1, wherein the wall thickness of the motor housing is 0.8 to 1.2 mm.

4. The motor housing made of titanium as defined in claim 3, wherein brushless DC motor is installed in the motor housing, a motor shaft of which extends out of the center hole of the barrel bottom and/or barrel cover.

5. A motor housing manufactured by using metal titanium, wherein the motor housing is calendar formed by stamping process by using titanium, the motor housing is of a barrel structure, a barrel wall and bottom are integrally stamped and formed, the other end of the barrel is provided with a barrel cover, a rim of the barrel cover is embedded into a stepped groove on an inside of the barrel wall, and the barrel bottom and the barrel cover form a symmetrical structure, wherein the wall thickness of the motor housing is 0.8 to 1.2 mm, and wherein brushless DC motor is installed in the motor housing, a motor shaft of which extends out of the center hole of the barrel bottom and/or barrel cover, wherein the motor housing is a thin-walled housing structure and the barrel wall is a circular bushing, wherein the barrel bottom and barrel cover are respectively provided with two sections of outward protruding concentric bosses, the barrel bottom and barrel cover are also respectively provided with shaft holes, and fillet connection is provided between the concentric bosses as well as between the concentric boss and the barrel wall, wherein a pair of center symmetrical electrode lead-out holes is provided at the barrel bottom or barrel cover, wherein a through window is provided in the barrel wall near the electrode lead-out hole, wherein the barrel cover is connected with the barrel wall through a welded or riveted structure, and wherein the ratio of length to diameter of the motor housing is 1.2 to 1.8:1.

* * * * *